United States Patent [19]

Boensch

[11] Patent Number: 5,035,458
[45] Date of Patent: Jul. 30, 1991

[54] ANTI-INGRESS SYSTEM FOR A MOTOR VEHICLE

[76] Inventor: Robert G. Boensch, 3941 Bessinger Rd., AuGres, Mich. 48703

[21] Appl. No.: 398,087

[22] Filed: Aug. 24, 1989

[51] Int. Cl.⁵ ............................ B60R 25/00; B60J 1/20
[52] U.S. Cl. ...................................... 296/1.1; 296/32; 296/36; 296/95.1
[58] Field of Search ......................... 296/1.1, 3, 32, 36, 296/95.1, 100; 49/56, 67

[56] References Cited

U.S. PATENT DOCUMENTS

| | | | |
|---|---|---|---|
| 1,681,062 | 8/1928 | Sparshatt | 296/100 |
| 2,865,670 | 12/1959 | Dunn | 296/24.1 |
| 3,049,363 | 8/1962 | Marx | 280/748 |
| 3,765,713 | 10/1973 | Suitt | 296/3 |
| 3,841,695 | 10/1974 | Woodward | 296/43 |
| 3,907,057 | 9/1975 | Reddekopp | 180/89.2 |
| 4,405,170 | 9/1983 | Raya | 296/10 |
| 4,564,216 | 1/1986 | Kinyon et al. | 280/770 |
| 4,611,824 | 9/1986 | McIntosh | 280/748 |
| 4,653,562 | 3/1987 | Moss et al. | 160/105 |
| 4,695,087 | 9/1987 | Hollrock | 296/14 |
| 4,708,384 | 11/1987 | La Rosa | 296/24.1 |

FOREIGN PATENT DOCUMENTS

| | | | |
|---|---|---|---|
| 1471209 | 3/1967 | France | 296/95.1 |
| 2491009 | 4/1982 | France | |
| 2194764 | 3/1988 | United Kingdom | 296/95.1 |

Primary Examiner—Margaret A. Focarino
Assistant Examiner—Andrew C. Pike
Attorney, Agent, or Firm—Peter D. Keefe

[57] ABSTRACT

An anti-ingress system for the doors, the side windows and the rear window of motor vehicles, in particular pick-up trucks, has a mounting frame is secured to the pick-up truck adjacent the rear of the cab, a rear anti-ingress panel is connected with the mounting frame so as to cover the rear window of the cab, and, on each opposite side of the mounting frame, a side window anti-ingress panel is movably mounted to the mounting frame so as to permit each side window anti-ingress panel to be located in one of two positions: a first position clear of the door and its side window, and a second position interferingly located adjacent the door and the side window, thereby preventing unauthorized entry through the side window as well as preventing unauthorized opening of the door. There are several embodiments of preferred structures that provide selective, locable movement of the two side window anti-ingress panels.

23 Claims, 6 Drawing Sheets

ANTI-INGRESS SYSTEM FOR A MOTOR VEHICLE

BACKGROUND OF THE INVENTION

1. Field of the Invention:

The present invention relates to grating-type devices which are used to cover windows for preventing unauthorized entry. More particularly the present invention relates to a device having panels which may selectively cover side windows of a motor vehicle in order to prevent both unauthorized door opening and entry into the motor vehicle through the side window.

2. Description of the Prior Art:

Motor vehicle theft and vandalism has been on the rise, and no end appears in sight. For the most part, electronic alarm systems fail to prevent vandals from breaking into a parked, unattended motor vehicle because they merely sound an alarm when unlawful entry is gained; they do not prevent the entry itself. Consequently, thieves and vandals frequently feel they can "get away with" breaking into an alarm equipped motor vehicle, thereby diminishing the deterrent effect of alarm devices, no matter how elaborate, no matter how expensive.

It is well known that the most common method of entry is by opening one of the side doors of the motor vehicle, usually through the use of a tool which toggles the internal lock system within the door. Another common entry method is by breaking one of the side windows of the motor vehicle, thereby permitting a thieving hand to enter the motor vehicle and either do damage, remove articles, or unlock the door from the inside to permit easy entry. So too, a vandal may smash through the rear window to do mischief. Least likely is the vandal able to enter the motor vehicle from either the windshield or the sheet metal. The windshield is constructed by means of a very tough lamination process which is not susceptible to breaking through by simple blows, as are the side windows. The sheet metal can be cut-through only by means of tools which are generally unavailable to common thieves.

Accordingly, a true theft-proof motor vehicle is one in which entry cannot be gained through the side and rear windows and one in which the doors cannot be opened except by the operator of the motor vehicle, whether or not the door lock itself is in the unlocked position.

In the prior art, there are several examples of devices which to a very limited extent provide a modicum of protection against thieves. U.S. Pat. Nos. 4,611,824, 4,564,216, and 3,765,713 disclose the use of an expanded metal grill-work that covers the back window of a pick-up truck adjacent the cargo box. Such an expanded metal cover can serve to prevent a would-be thief from gaining entry into the cab through the back window, provided the expanded metal is attached in a secure fashion to the pick-up. French Patent 2,491,009 discloses an anti-theft grill which fits into the side window frame of a motor vehicle. As an interesting and contrasting example, U.S. Pat. No. 4,653,562 discloses a grill-work which is removably located in the side window channel of a motor vehicle, not for keeping thieves out, but for keeping small children and dogs in while the window is rolled down.

In any event, the prior art fails utterly to disclose any structure which can 1) prevent a thief from opening the motor vehicle doors irrespective of whether the door lock has been switched to, or accidentally left in, the unlocked position, and 2) prevent a thief from opening the doors and further from gaining entry through either the side windows or rear window of the motor vehicle.

SUMMARY OF THE INVENTION

The present invention is an anti-ingress system for the doors and the side and rear windows of motor vehicles, in particular pick-up trucks.

Basically, the present invention incorporates a mounting frame secured to the pick-up truck adjacent the rear of the cab, a rear anti-ingress panel is connected with the mounting frame so as to cover the back window of the cab, and, on each opposite side of the mounting frame, a side window anti-ingress panel is movably mounted to the mounting frame so as to permit the side window anti-ingress panel to be located in one of two positions: a first position clear of the door and its side window, and a second position interferingly located adjacent the door and the side window, thereby preventing unauthorized entry through the side window and preventing unauthorized opening of the door.

Accordingly, it is an object of the present invention to provide an anti-ingress system that prevents unauthorized entry into a motor vehicle, particularly a pick-up truck, through the back window, through either side window, or through an opened door.

It is another object of the present invention to provide an anti-ingress system for a motor vehicle in which ingress is prevented by an anti-ingress panel swingingly connected with the motor vehicle adjacent each door of the motor vehicle and which is selectively lockable in position with respect to the motor vehicle.

It is still another object of the present invention to provide an anti-ingress system for a motor vehicle in which ingress is prevented by an anti-ingress panel pivotably connected with the motor vehicle adjacent each door of the motor vehicle and which is selectively lockable in position with respect to the motor vehicle.

It is yet a further object of the present invention to provide an anti-ingress system for a motor vehicle in which ingress is prevented by an anti-ingress panel that is removably connected with the motor vehicle adjacent each door of the motor vehicle and which is selectively lockable in position with respect to the motor vehicle.

It is still an additional object of the present invention to provide an anti-ingress system for a motor vehicle which is adaptable for use with respect to pick-up truck extended cabs, inclusive of crew cabs.

It is yet an additional object of the present invention to provide an anti-ingress system for a motor vehicle having solar energy shielding anti-ingress panels.

It is yet a further object of the present invention to provide an anti-ingress panel for covering the rear window of a pick-up truck so as to prevent any load carried in the cargo box from crashing into the cab.

It is still an additional object of the present invention to provide an anti-ingress panel adjacent each door of a pick-up truck, the anti-ingress panels being movably connected with the pick-up truck so that when they are positioned in a forward position they prevent ingress into the cab, but when they are positioned in a rearward position, they assist the sidewalls of the cargo box to confine loads carried in the cargo box.

These, and additional objects, advantages, features, and benefits of the present invention will become apparent from the following specification.

DETAILED DESCRIPTION OF THE PREFERRED EMBODIMENTS

Figure 1:
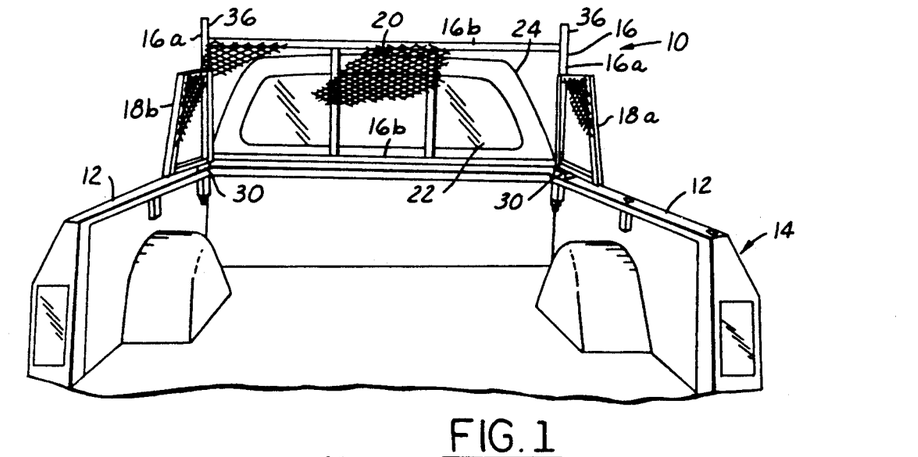
FIG. 1 is a rear perspective view of a pick-up truck having mounted thereon the motor vehicle anti-ingress system according to the first preferred embodiment of the present invention, particularly showing the side window anti-ingress panels in a rearward storage position.

Referring now to the Drawings, FIG. 1 shows a first embodiment, which is most preferred, of the motor vehicle anti-ingress system 10. It will be seen from FIG. 1 that the motor vehicle anti-ingress system 10 is mounted upon the cargo box sidewalls 12 of a pick-up truck 14, which is the preferred, but not only, environment of its use. In this regard, the motor vehicle anti-ingress system 10 is usable on a motor vehicle having right and left sides, where each of these sides has at least one door. As can be further seen from FIG. 1, the motor vehicle anti-ingress system 10 is composed, generally, of a mounting frame 16 having a left side 16L and a right side 16R, a pair of side window anti-ingress panels 18a and 18b which are swingably mounted to the mounting frame 16 side window anti-ingress panel 18a being mounted to the right side 16R of the mounting frame 16, side window anti-ingress panel 18b being mounted to left side 16L of the mounting frame 16. A rear anti-ingress panel 20 is affixed to the mounting frame 16. The mounting frame 16 is affixed to the cargo box sidewalls 12 preferably at the conventionally provided forward stake holes, described hereinbelow with respect to FIG. 7. At this location, the rear anti-ingress panel will prevent unauthorized entry through the back window 22 of the cab 24. The cab defines an occupant compartment having a right side, a left side, and a rear side, each of said right and left sides having at least one side door; typically the cab-defined occupant compartment will have a righ side door and a left side door, each door having a side window, and, also, the cab will have a rear side having a rear window. As can best be seen in FIG. 2, the two side window anti-ingress panels 18a and 18b can be swung around into locked adjacency with the side windows 26 of the side doors 28, thereby preventing unauthorized entry through the side windows and through the doors themselves.

Referring now to FIGS. 1 through 10, the first preferred embodiment of the motor vehicle anti-ingress system 10 will be described in detail.

The mounting frame 16 is preferred to be constructed of steel, but can be made of other structurally strong materials, particularly those materials which are known in the art to be lightweight and corrosion resistant. The mounting frame 16 is dimensioned in a general rectangular shape, having a height similar to that of the uppermost portion of the cab 24 above the cargo box sidewalls 12, and having a width which is similar to that of the cab. The mounting frame includes two vertical frame members 16a and two horizontal frame members 16b. In certain applications, it may be possible for a conventional roll-bar to serve as the mounting frame.

Figure 7:
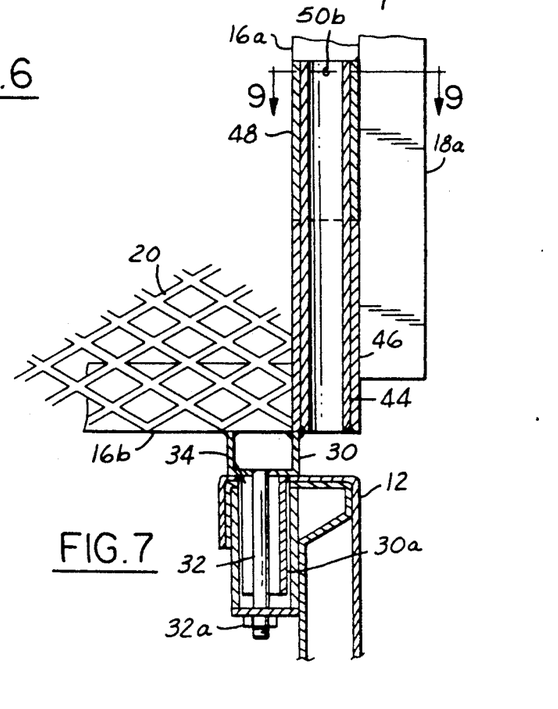
FIG. 7 is a detail partly sectional side view of part of the motor vehicle anti-ingress system of FIG. 1, showing the hinge mechanism and mounting mechanism for the motor vehicle anti-ingress system where the side window anti-ingress panel is in the forward operational position of FIG. 5.

FIG. 7 shows a preferred mounting structure; it is to be understood that many other mounting structures may be incorporated which are within the kin of the artisan. In the mounting structure shown in FIG. 7, a foot 30 is connected to the bottom of the mounting frame 16, serving as a resting surface for the mounting frame upon each of the cargo box sidewalls 12. A foot extension 30a is structured to insert into the conventional stake hole 34 on the cargo box sidewall 12. A bolt 32 connected with the foot 30 runs through the conventional stake hole 34 and through the foot extension 30a, and is secured with respect to the cargo box sidewall by a nut 32a. It is preferred to include a mast 36 at the upper ends of the two vertical frame members 16a, so that the user may optionally attach items, such as lights, thereto.

The rear anti-ingress panel 20 is preferred to be constructed of a security providing material, such as expanded metal, woven wire, or solid flat material which may or may not have perforations or louvers; expanded metal is preferred. Preferred construction materials include steel, aluminum, fiberglass, plastic, and composites. It is also preferred that the rear anti-ingress panel provide solar radiation shielding for the interior of the motor vehicle, with respect to any solar energy which might otherwise enter thereinto through the rear window 22, the rear window being in adjacency with the rear anti-ingress panel. The rear anti-ingress panel 20 is preferred to be directly connected to the mounting frame 16 at each of the vertical and horizontal frame members, 16a and 16b respectively. The rear anti-ingress panel is intended to prevent entry into the cab 24 (or other motor vehicle to which it is attached) through the rear window 22; thus, the rear anti-ingress panel must be dimensioned so that it covers the window sufficiently with this purpose in mind. Further, the rear anti-ingress panel serves an added role as protection against a load being carried in the cargo box from shifting during an untoward incident; thus, the occupants have piece of mind knowing the load cannot disasterously penetrate through the rear window in an accident.

Figure 2:
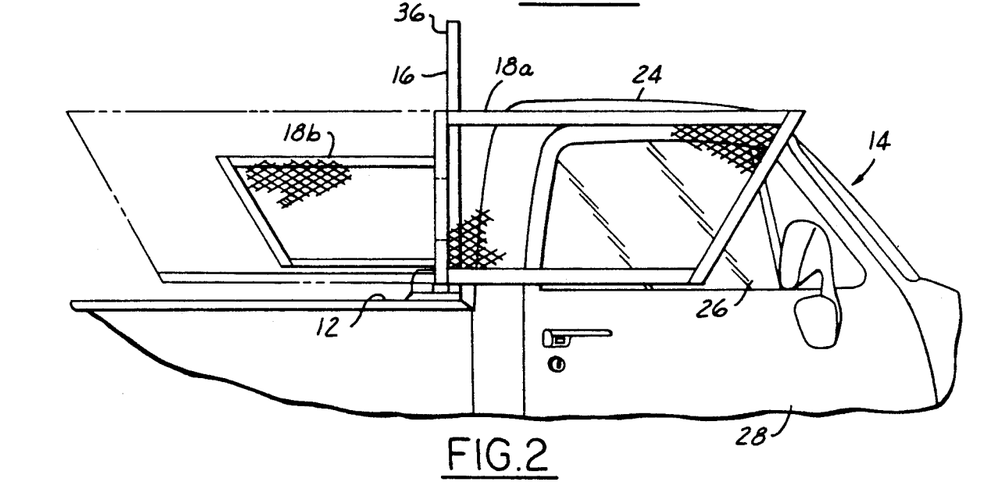
FIG. 2 is a side view of the motor vehicle anti-ingress system shown in FIG. 1, particularly showing one of the side window anti-ingress panels now swung into the forward operational position.
Figures 4, 5:
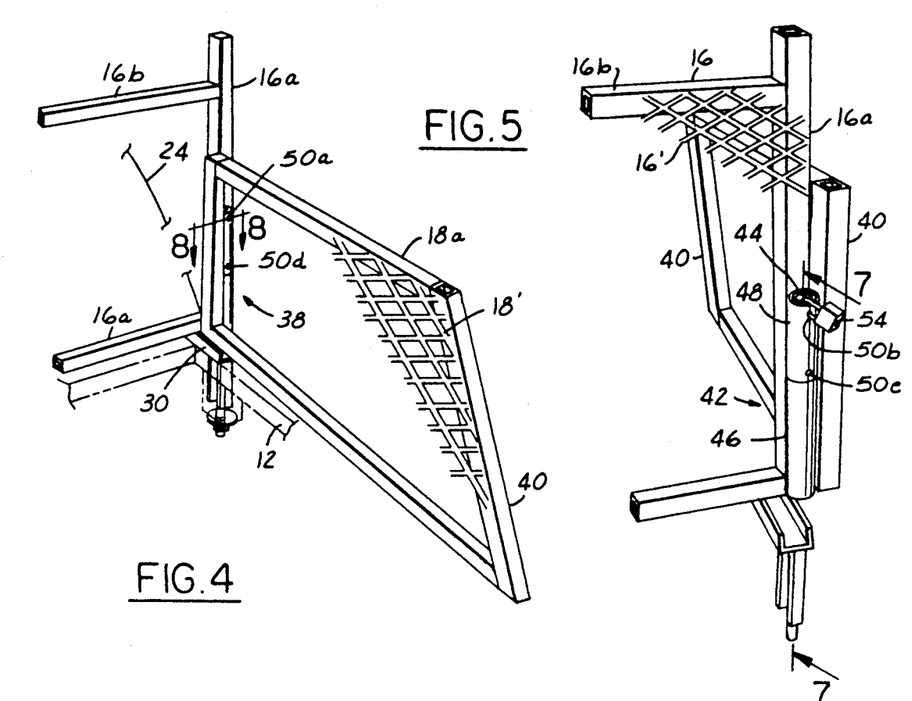
FIG. 4 is a detail perspective view of a portion of the motor vehicle anti-ingress system according to the first preferred embodiment of the present invention, particularly showing a swingably mounted side window anti-ingress panel in the rearward storage position.
FIG. 5 is a detail perspective view of a portion of the motor vehicle anti-ingress system of FIG. 1, now showing a side window anti-ingress panel locked in the forward operational position.

The side window anti-ingress panels 18a and 18b are identically constructed, the detail of which can be understood by reference to FIG. 4. The side window anti-ingress panel 18a is swingably connected with one of the vertical frame members 16a, via a hinge system 38. The side window anti-ingress panels 18a and 18b are constructed of an anti-ingress panel 18' that is made of the same material, having the same properties, as that described for the rear anti-ingress panel 20, and are further constructed of a panel frame 40 which serves to provide rigidity and structural connection for the anti-ingress panels to the hinge system 38. The side window anti-ingress panels are preferred to be dimensioned so that they may be swung into adjacency with the side window 26, a short distance being spaced therebetween, and at least a sufficient amount of the window will be coextensively covered by the side window anti-ingress panel so as to prevent unauthorized entry into the cab. As shown in FIG. 2, the exact shape of the side window anti-ingress panel may be modified to accommodate door mounted rearview mirrors.

The hinge system 38 is shown particularly in FIGS. 4, 5, and 7. Connected with a lower corner of the mounting frame 16 at each of the vertical frame members 16a, is a stationary hinge component 42. The stationary hinge component includes a hinge pin 44 and a hinge pin base 46. Connected with each of the side window anti-ingress panels 18a and 18b is a hinge knuckle 48 which is apertured to fit onto the hinge pin 44. The hinge knuckle is provided with lock holes 50a and 50b, which are located so as to selectively line-up with lock holes 52a and 52b on the hinge pin, as will be detailed, momentarily.

Figure 8:
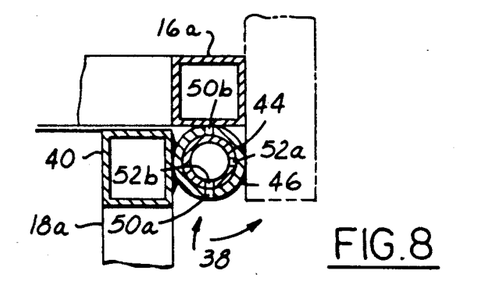
FIG. 8 is a detail sectional plan view of the upper part of the hinge mechanism, shown along lines 8—8 in FIG. 4, where the side window anti-ingress panel is shown in the rearward storage position.
Figure 9:
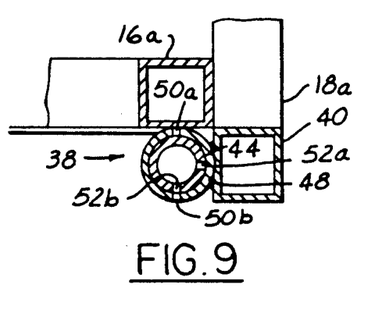
FIG. 9 is a detail sectional plan view of the upper part of the hinge mechanism, shown along lines 9—9 in FIG. 7, where the side window anti-ingress panel is shown in the forward operational position.

In operation, the two side window anti-ingress panels are stored most easily in the rear storage position, shown in FIGS. 1 and 4. In order that the side window anti-ingress panels remain affixed in the rear storage position, holes 50a and 52b are aligned as shown in FIG. 8, and a conventional lock 54 is put therethrough. Now, when it is desired to lock the motor vehicle, each lock 54 is removed from the motor vehicle anti-ingress system 10, and the side window anti-ingress panels 18a and 18b are swung into adjacency with the side windows of the pick-up. The side window anti-ingress panels are held fixedly a short distance removed from the side door by simply aligning holes 50b and 52b and then putting the lock 54 through them, as shown in FIG. 9, for each side window anti-ingress panel. To again store the side window anti-ingress panels, the user need only remove the locks 54 and reverse the steps just outlined.

Figure 3:
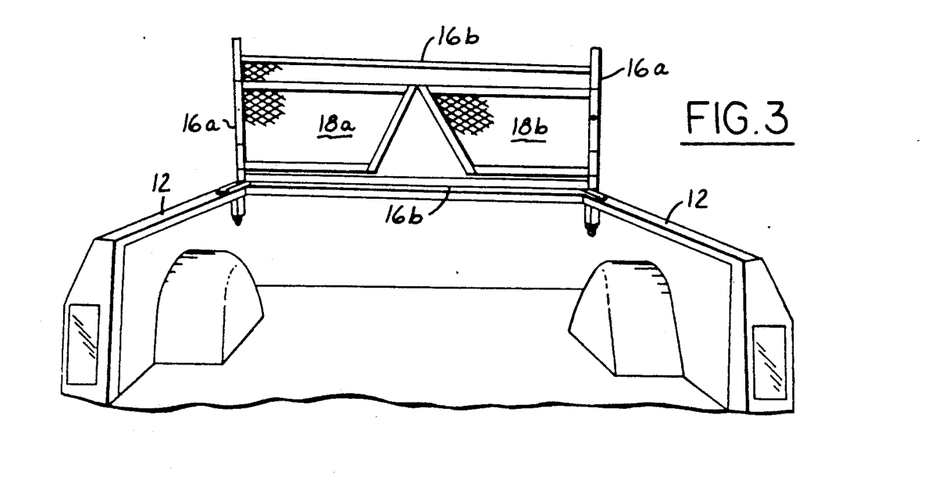
FIG. 3 is a rear perspective view of the pick-up truck shown in FIG. 1, but now having the two side window anti-ingress panels placed in the rear stowaway position.
Figure 6:
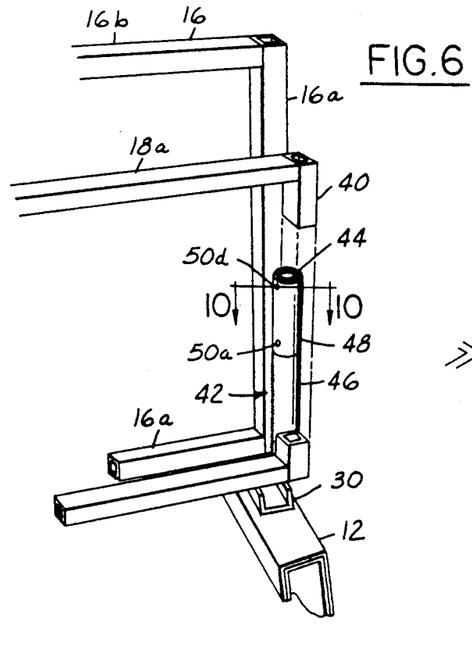
FIG. 6 is a detail perspective view of a portion of the motor vehicle anti-ingress system of FIG. 1, now showing the side window anti-ingress panel in the rear stowaway position.
Figure 10:
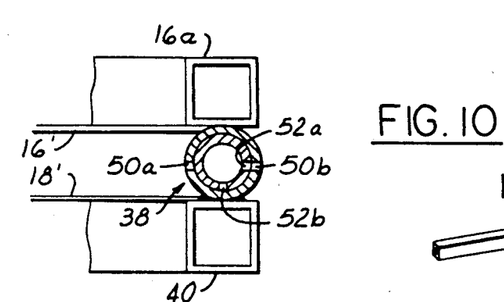
FIG. 10 is a detail sectional plan view of the upper part of the hinge mechanism, shown along lines 10—10 in FIG. 6, where the side window anti-ingress panel is shown in the rear stowaway position.

As a variation in storage, the side window anti-ingress panels may be stored in a stowaway position adjacent the rear panel 16, as shown in FIGS. 3 and 6. To accomplish this, the side window anti-ingress panels must be removed off their respective hinge pins and then placed upon the respectively opposite hinge pin, or inverted and replaced on their original hinge pin. In the case of changing hinge pins, hole 50b is radially aligned with hole 52a, as shown in FIG. 10, and the lock 54 put therethrough. Thusly, the side window anti-ingress panel 18a is shown in FIG. 5 being located at the hinge pin 44 adjacent the right side 16R of the mounting frame 16, while the side window anti-ingress panel 18b is shown in FIG. 10 being located at this same hinge pin after side window anti-ingress panel 18a has been removed. In the case of not changing hinge pins, it is mandatory that the hinge knuckle 48 be centrally located on the panel frame 40 because the side window anti-ingress panels must be lifted off the hinge pins 44, turned up-side-down and then mounted back on the same hinge pin. Thus, the hinge knuckles must be located so as to be symmetrical on the panel frame 40. Further, there must be located on each hinge knuckle a hole 50d located in axial alignment with respect to hole 50a, as shown in FIG. 4, and a hole 50e located in axial alignment with respect to hole 50b, as shown in FIG. 5. Thus, when the side window anti-ingress panels are removed, inverted and replaced on the same hinge pin, the hole 50e aligns with the hole 52a. An advantage of axially aligned holes at each end of a symmetrically located hinge knuckle is that the side window anti-ingress panels may be operated in a right-side-up or inverted orientation, as desired.

Referring now to FIGS. 11 through 16, a second embodiment of the motor vehicle anti-ingress system 10 will be described, in which the mounting frame 16 and the rear panel 20 remain unchanged from that described above, and the side window anti-ingress panels 18a and 18b are also unchanged, except that they are pivotally mounted to the mounting frame, rather than swingingly mounted thereto.

Figure 11:
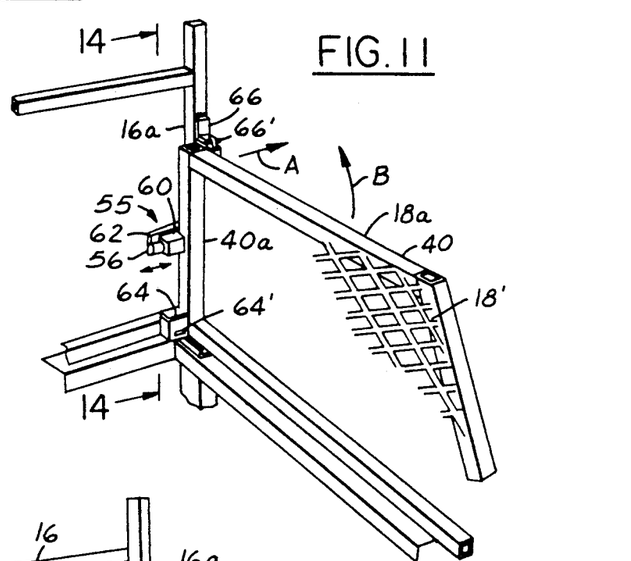
FIG. 11 is a detail perspective view of a portion of an motor vehicle anti-ingress system according to a second preferred embodiment of the present invention, particularly showing a side window anti-ingress panel that is pivotably mounted, where the side window anti-ingress panel is in the rearward storage position.
Figure 12:
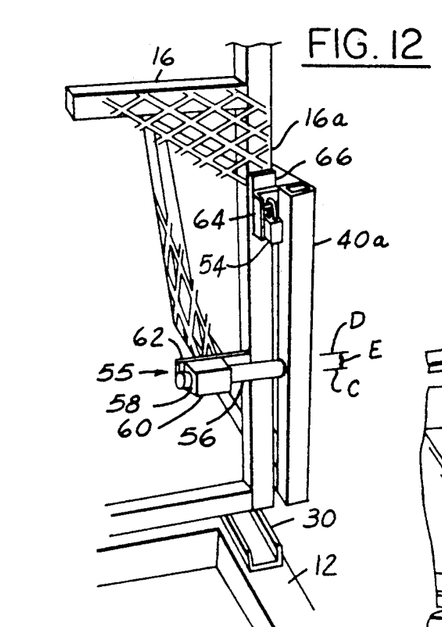
FIG. 12 is a detail perspective view of a portion of the second embodiment of the motor vehicle anti-ingress system shown in FIG. 11, but with the side window anti-ingress panel now shown in the forward operational position.
Figure 13:
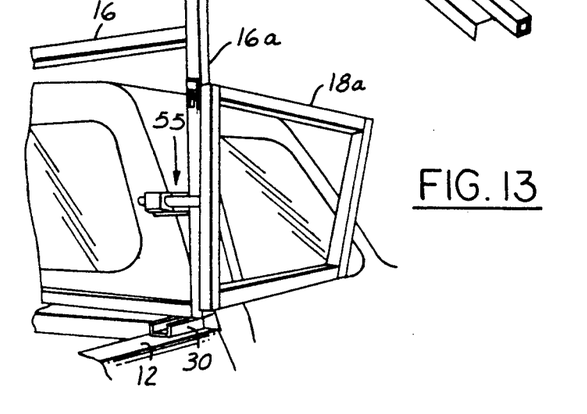
FIG. 13 is a perspective view showing a portion of the motor vehicle anti-ingress system of FIG. 12 in operation on a pick-up truck.

FIG. 11 shows the side window anti-ingress panel 18a located in the rear storage position. Now, referring also to FIGS. 12 and 14, the pivot mechanism 55 will be described. A pivot pin 56 is connected with the panel frame 40 at a slight offset location, the nature of which will be described momentarily. The pivot pin 56 inserts into an aperture 58 in a pivot block 60 which is connected, via a stand off 62, with a vertical frame member 16a of the mounting frame 16. The purpose of the stand off will become clear momentarily. Each side window anti-ingress panel 18a and 18b is locked with respect to the mounting frame, as exemplified in FIG. 12 when in the forward operational position (and shown more generally in FIG. 13). To accomplish locking, a panel portion locking member 64, having a slot 64', is connected with the panel frame 40, and a mounting frame portion locking member 66, having a tab 66', is connected with the mounting frame 16. When the side window anti-ingress panel is pivoted to the forward operational position, the tab 66' will be received by the slot 64'. A lock 54 may then be inserted through a hole 66a on the tab to lock the side window anti-ingress panel in place. It is preferred for the side window anti-ingress panels to be in a location which is co-extensive with the cargo box sidewall 12 when they are in the rear storage position, as shown in FIG. 11. In order that the side window anti-ingress panel be pivotable, it must be first slid outwardly along arrow A, so that the side window anti-ingress panel may clear the vertical frame member 16a before it is pivoted along arrow B to the forward operational position. This is accomplished by permitting the pivot block to be slidable with respect to the pivot pin 56, the farthest inward movement (in a direction opposite to arrow A) being defined by the pivot block 60 being off-set from the vertical frame member 16a via the stand-off 62. This is further accomplished by the pivot pin 56 being mounted off-set, as mentioned above. As shown in FIG. 12, by mounting the pivot pin at a location C a short distance off-set from the center D of the vertical panel frame member 40a, as the side window anti-ingress panel 18a is slid outward along arrow A, it will clear the tab 66', but after it is pivoted along arrow B, tab 66' will be received by slot 64'.

Figures 14, 15, 16, 17:
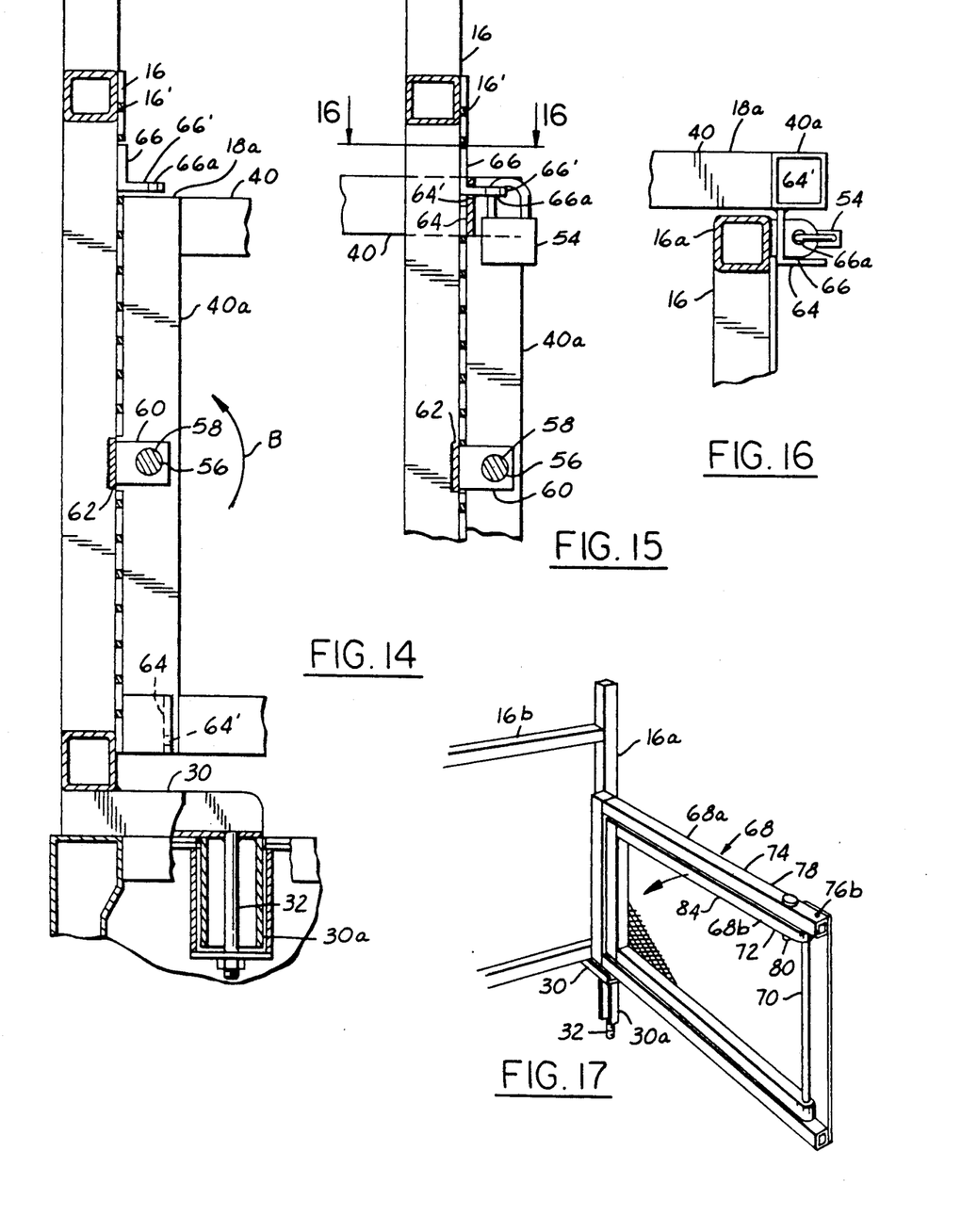
FIG. 14 is a partly sectional side view of the motor vehicle anti-ingress system shown along lines 14—14 in FIG. 11, particularly showing the pivoting mechanism and mounting mechanism.
FIG. 15 is a partly sectional side view of part of the motor vehicle anti-ingress system seen along lines 15—15 in FIG. 12, showing particularly the locking mechanism in operation when the side window anti-ingress panel is in the forward operational position.
FIG. 16 is a detail partly sectional plan view of the locking mechanism seen along lines 16—16 in FIG. 15.
FIG. 17 is a perspective view of a portion of a third embodiment of the motor vehicle anti-ingress system according to a third preferred embodiment of the present invention in which the side window anti-ingress panels are articulated so that they may be swingably extended.

In operation of the second embodiment of the motor vehicle anti-ingress system according to the present invention, each side window anti-ingress panel is slid outwardly along arrow A in FIG. 11 until the panel frame 40 clears the mounting frame 16. Then each side window anti-ingress panel is pivoted into the forward operational position, whereat the tab 66' is been received by the slot 64' and panel portion of the locking mechanism rests against the mounting frame, thereby preventing further rotation, as shown in FIGS. 15 and 16. The lock 54 is now put through the hole in the tab 66', thereby locking the side window anti-ingress panel in the aforesaid position, again as shown in FIGS. 15 and 16. Each of the side window anti-ingress panels may be returned to the rear storage position by reversing the steps just outlined.

Figure 18:
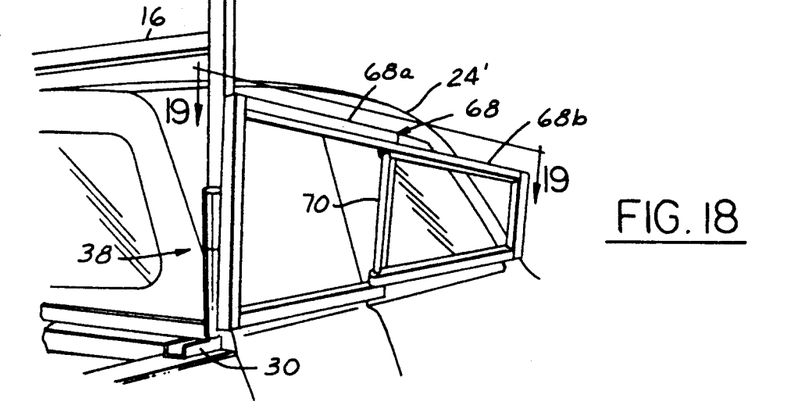
FIG. 18 is a perspective view of a portion of the motor vehicle anti-ingress system of FIG. 17, shown in operation on a pick-up truck having a club cab.
Figure 19:
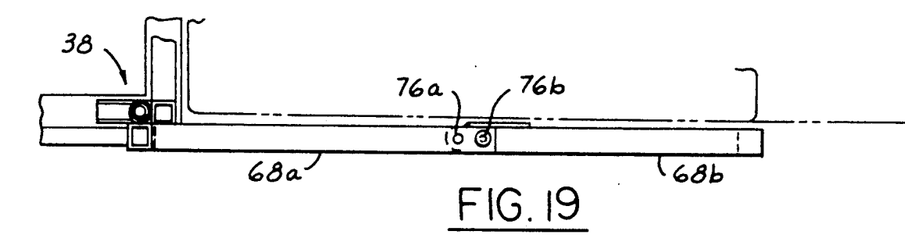
FIG. 19 is a plan view showing a portion of the motor vehicle anti-ingress system along lines 19—19 in FIG. 18.
Figure 20:
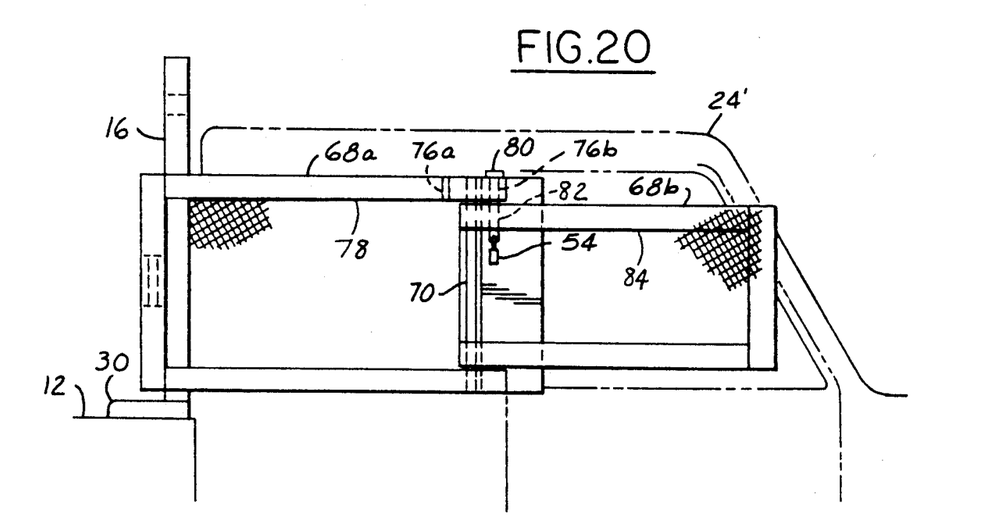
FIG. 20 is a side view of the motor vehicle anti-ingress system of FIG. 17, showing the side window anti-ingress panel locked in the forward operational position.

FIGS. 17 through 20 show a third alternative embodiment of the motor vehicle anti-ingress system 10 according to the present invention, which relates particularly to a variation in the first preferred embodiment described above. In the present embodiment, the side window anti-ingress panels 18a and 18b formerly described are now modified so as to be extendable anti-ingress panels 68, constructed as a main panel 68a and a swingably attached folding panel 68b. This alternative embodiment is particularly well suited to situations involving pick-up trucks incorporating extended cab configurations. In these kinds of cabs, the door and side window are further distanced from the mounting frame 16 than would be the case in conventional pick-up trucks, ergo, the reason for an extension feature being associated with the side window anti-ingress panels. Indeed, in the crew cab version of an extended cab, there are two doors on each side of the cab, the anti-ingress panels of the present invention accordingly being long enough to cover the side windows associated with each door. An extended cab 24' is shown in FIGS. 18 and 20.

With reference to FIGS. 18 and 19, it will be seen that each extendable anti-ingress panel 68 is swingably connected, at the main panel 68a, with the vertical frame member 16a in the manner hereinabove described in detail with respect to the hinge system 38 of the first embodiment of the motor vehicle anti-ingress system 10.

As can be discerned from FIGS. 17 through 20, a swing pin 70 is connected with the frame 72 of the folding panel 68b, and the swing pin projects into the frame 74 of the main panel 68a, thereby providing a hinge point for swinging the foldable panel relative to the main panel. On either side of the location of the swing pin 70, is located a hole 76a and 76b in the upper frame member 78 of the frame 74. A lock pin 80 is inserted through either of the holes 76a and 76b and extends through an aligned hole 82 in the upper frame member 84 of the frame 72, which selectively locks the folding frame in either the folded position shown in FIG. 17 or the unfolded position shown in FIGS. 18 through 20. Thusly, the lock pin 80 extends through holes 76a and 82 in FIG. 17, and it extends through holes 76b and 82 in FIGS. 18 through 20. As shown in FIG. 20, the lock pin 80 is provided with a hole at its tip which allows the lock 54 to be put therethrough to ensure the exendable anti-ingress panel 68 will remain in the position desired by the user independent of the thoughts and desires of other individuals.

In operation of the third preferred embodiment of the motor vehicle anti-ingress system 10, the hinge system 38 is unlocked as described hereinabove, and the main panel with its associated folding panel are then swung into the forward operational position and locked thereat in the manner described hereinabove. Then the lock pin is removed from holes 76a and 82, and the folding panel is then swung 180 degrees to the forward position shown in FIG. 18. The lock pin is then placed into holes 76b and 82 and the lock secured to the lock pin. To return the extension anti-ingress panel to its original rear storage position, the aforesaid steps are reversed.

FIGS. 21 through 24 show a fourth preferred embodiment of the motor vehicle anti-ingress system 10, which like the third preferred embodiment disclosed immediately above, utilizes the hinge system 38 of the first preferred embodiment, and which, also like the third embodiment, is intended to accommodate extended cabs 12'. In the present embodiment, the aforementioned side window anti-ingress panels now are modified so as to form telescopic anti-ingress panels 86.

Figure 21:
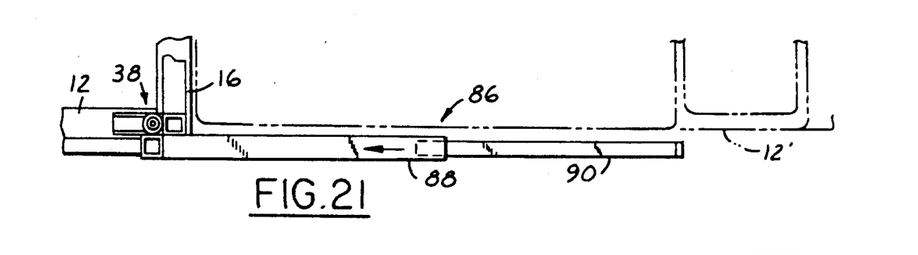
FIG. 21 is a plan view of a fourth preferred embodiment of the motor vehicle anti-ingress system according to the present invention in which each side window anti-ingress panel is constructed so as to be mutually telescopic.

As can be discerned from FIG. 21, a main panel 88 is connected with the hinge system 38. The main panel 88 is structured to permit a telescoping panel 90 to slide in and out of the main panel. As can best be seen from FIGS. 22 through 24, the main panel 88 has a frame 92 made in the form of "U" channels, the anti-ingress panel 88' being located on the outside surface 94 thereof. The telescoping panel 90 has a frame 96 which is dimensioned to slide in the "U" channels of the main frame, with the anti-ingress panel 90' being located on the inside surface 98 thereof.

Figure 22:
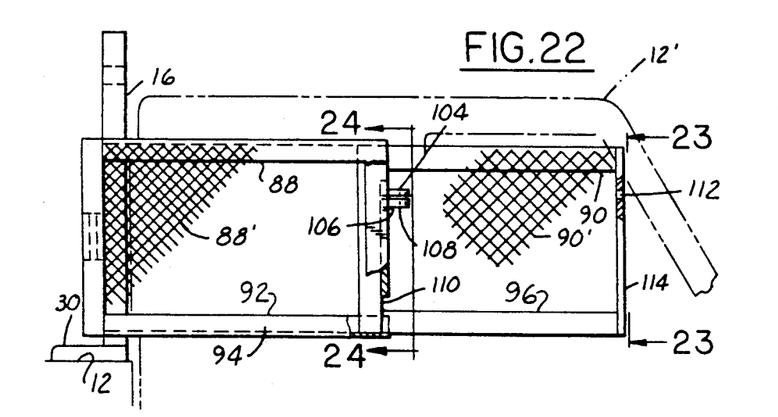
FIG. 22 is a partly sectional side view of the motor vehicle anti-ingress system of FIG. 21.
Figure 23:
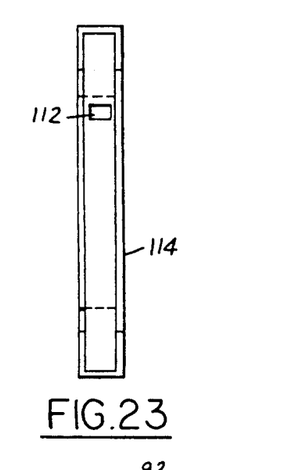
FIG. 23 is an end view of the side window anti-ingress panels as seen along lines 23—23 in FIG. 22.
Figure 24:
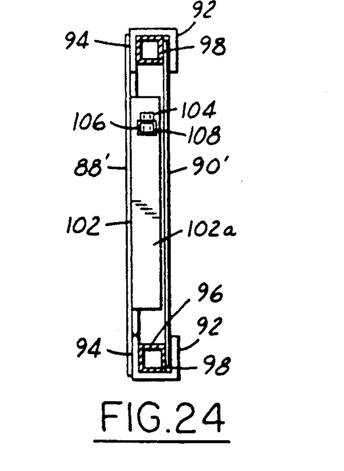
FIG. 24 is an end view of the side window motor vehicle anti-ingress system as seen along lines 24—24 in FIG. 22.

In order that the telescoping panel be affixable at either the non-telescoped position, in which the telescoping panel is received in the main panel, or the telescoped position, as shown in FIGS. 21 and 22, a telescope locking mechanism 100 is provided, as follows. An angle member 102 is secured to the outside surface 94 of the frame 92 so that one side 102a of the angle member 102 projects into the space between the "U" shaped channels. It will be noted from a review of FIG. 24, that the telescoping panel 90 can slide with respect to the main panel 88 because the anti-ingress panel 90' and the panel frame 96 both are positioned clear of the projecting side 102a of the angle member 102. The projecting member 102a has connected thereto a tab 104 and immediately therebelow a slot 106. The frame 96 is provided with a tab 108 on its inboard frame member 110 and a slot 112 on its outboard frame member 114. Both tabs 104 and 108 are oriented toward the outboard frame member. The slot 106 and the tab 108 are mutually positioned so that when the telescoping panel 90 is fully telescoped out of the main panel 88, the tab 108 is received by the slot 106. A hole 108' is provided on the end of the tab 108 so that the lock 54 may be secured thereto in a manner as described above. The tab 104 and the slot 112 are mutually positioned so that when the telescoping panel 90 is fully telescoped into the main panel 88, the tab 104 is received by the slot 112. A hole 104' is also provided on the tab 104 so that the aforesaid lock may be placed thereon.

In operation of the fourth preferred embodiment of the motor vehicle anti-ingress system according to the present invention, the user swings the main panel 88 with its associated telescoping panel 90 into the forward operational position, in the manner described fully hereinabove. Next the user removes the lock 54 from the tab 104, then pulls on the telescoping panel 90 to extend it outwardly with respect to the main panel 88 until the tab 108 is received by the slot 106. Thereupon the lock is placed upon the tab 108. To return the telescopic anti-ingress panels 86 back to the rear storage position, the steps just outlined are simply reversed.

Figure 25:
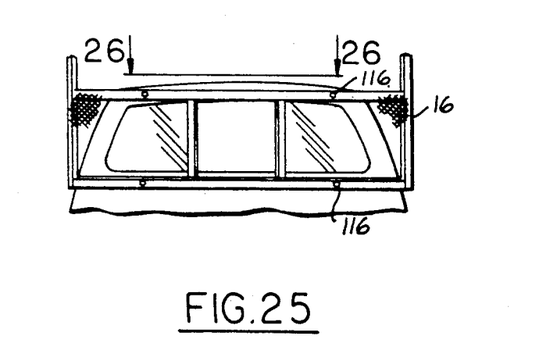
FIG. 25 is a rear view of the mounting frame according to the motor vehicle anti-ingress system according to the present invention mounted directly to a truck cab.
Figure 26:
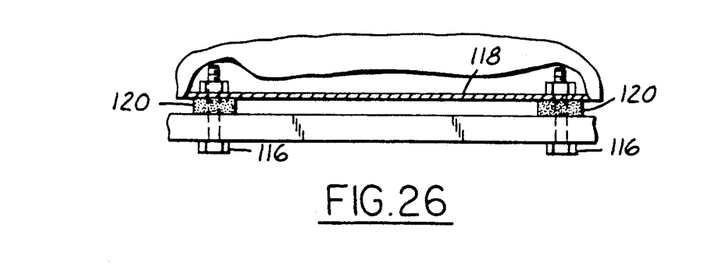
FIG. 26 is a partly sectional detail view of the mounting mechanism for mounting the motor vehicle anti-ingress system of FIG. 25 onto the truck cab.

FIGS. 25 and 26 show yet another alternative preferred embodiment of the motor vehicle anti-ingress system 10, in which the mounting frame 16 is mounted directly to the back of the cab 24. This is accomplished by use of bolts 116 which attach the mounting frame 16 to the wall 118 of the cab 24. Rubber washers are positioned between the mounting frame 16 and the wall 118 in order to provide a tight water resistant seal.

To those skilled in the art to which this invention appertains, the above described preferred embodiments may be subject to change or modification. For instance, while the present invention has been described primarily with respect to pick-up trucks, this has been done only by way of preferred example. It is intended that the anti-ingress system disclosed herein be adaptable to truck tractor cabs and other types of motor vehicles. Such change or modification can be carried out without departing from the scope of the invention, which is intended to be limited only by the scope of the appended claims.

What is claimed is:

1. An anti-ingress system for a motor vehicle, said motor vehicle having an occupant compartment, said occupant compartment having a right side, a left side, and a rear side, each of said right and left sides having at least one side door, each said side door having a side window, said anti-ingress system comprising:

a mounting frame having a left side and a right side;

mounting means connected with said mounting frame for mounting said mounting frame to the motor vehicle adjacent said rear side of said occupant compartment;

a right-side anti-ingress panel movably connected with said right side of said mounting frame, said right-side anti-ingress panel being movable from a first right-side anti-ingress panel position to a second right-side anti-ingress panel position;

right-side hinge means connected with said mounting frame and said right-side anti-ingress panel for movably connecting said right-side anti-ingress panel to said right side of said mounting frame;

right-side locking means connected with said mounting frame and said right-side anti-ingress panel for selectively locking said right-side anti-ingress panel in said second right-side anti-ingress panel position;

a left-side anti-ingress panel movably connected with said left side of said mounting frame, said left-side anti-ingress panel being movable from a first left-side anti-ingress panel position to a second left-side anti-ingress panel position;

left-side hinge means connected with said mounting frame and said left-side anti-ingress panel for movably connecting said left-side anti-ingress panel to said left side of said mounting frame; and left-side locking means connected with said mounting frame and said left-side anti-ingress panel for selectively locking said left-side anti-ingress panel in said second left-side anti-ingress position;

said left-side and right-side anti-ingress panels being dimensioned so that when said mounting frame is mounted on said motor vehicle by said mounting means so that said right-side anti-ingress panel is located adjacent said right side of said occupant compartment and so that said left-side anti-ingress panel is located adjacent said left side of said occupant compartment, said right-side anti-ingress panel does not interfere with opening said at least one side door of said right side of said motor vehicle when said right-side anti-ingress panel is at said first right-side anti-ingress panel position but said right-side anti-ingress panel does interfere with opening said at least one side door of said right side of said motor vehicle and further said right-side anti-ingress panel prevents ingress into the occupant compartment through each side window of said at least one side door of said right side of said motor vehicle when said right-side anti-ingress panel is at said second right-side anti-ingress panel position, and said left-side anti-ingress panel does not interfere with opening said at least one side door of said left side of said motor vehicle when said left-side anti-ingress panel is at said first left-side anti-ingress panel position but said left-side anti-ingress panel does interfere with opening said at least one side door of said left side of said motor vehicle and further said left-side anti-ingress panel prevents ingress into the occupant compartment through each side window of said at least one side door of said left side of said motor vehicle when said left-side anti-ingress panel is at said second left-side anti-ingress panel position.

2. The anti-ingress system for a motor vehicle of claim 1, further comprising:
right-side extension means connected with said right-side anti-ingress panel for selectively extending said right-side anti-ingress panel from a first length to a second selectably lockable length; and
left-side extension means connected with left-side anti-ingress panel for selectively extending said left-side anti-ingress panel from a first length to a second selectably lockable length.

3. The anti-ingress system for a motor vehicle of claim 1, wherein the rear side of the occupant compartment of the motor vehicle has a rear window, said anti-ingress system for a motor vehicle further comprising a rear panel connected with said mounting frame, said rear panel being dimensioned so as to prevent ingress into said occupant compartment through the rear window of the rear side of the occupant compartment when said mounting frame is mounted to the motor vehicle adjacent the occupant compartment.

4. The anti-ingress system for a motor vehicle of claim 1, wherein said right-side hinge means and said left-side hinge means comprise:
a right-side hinge base connected with said right side of said mounting frame;
a right-side hinge pin connected with said right-side hinge base;
a right-side hinge knuckle connected with said right-side anti-ingress panel, said right-side hinge pin being received by said right-side hinge knuckle so that said right-side anti-ingress panel may be swung from said first right-side anti-ingress panel position to said second right-side anti-ingress panel position;
a left-side hinge base connected with said left side of said mounting frame;
a left-side hinge pin connected with said left-side hinge base; and
a left-side hinge knuckle connected with said left-side anti-ingress panel, said left-side hinge pin being received by said left-side hinge knuckle so that said left-side anti-ingress panel may be swung from said first left-side anti-ingress panel position to said second left-side anti-ingress panel position.

5. The anti-ingress system for a motor vehicle of claim 4, wherein said right-side locking means and said left-side locking means comprise:
a first lock;
a second lock;
a first hole in said right-side hinge pin aligning with a first hole in said right-side hinge knuckle so that a portion of said first lock may be passed therethrough so as to selectively lock said right-side anti-ingress panel relative to said mounting frame; and
a first hole in said left-side hinge pin aligning with a first hole in said left-side hinge knuckle so that a portion of said second lock may be passed therethrough so as to selectively lock said left-side anti-ingress panel relative to said mounting frame.

6. The anti-ingress system for a motor vehicle of claim 5, further comprising:
right-side extension means connected with said mounting frame and said right-side anti-ingress panel for selectively extending said right-side anti-ingress panel from a first length to a second selectably lockable length; and
left-side extension means connected with said mounting frame and said left-side anti-ingress panel for selectively extending said left-side anti-ingress panel from a first length to a second selectably lockable length.

7. The anti-ingress system for a motor vehicle of claim 5, wherein the rear side of the occupant compartment of the motor vehicle has a rear window, said anti-ingress system for a motor vehicle further comprising a rear panel connected with said mounting frame, said rear panel being dimensioned to prevent ingress into said occupant compartment through the rear window of the rear side of the occupant compartment when said mounting frame is mounted to the motor vehicle adjacent the occupant compartment.

8. The anti-ingress system of claim 5, further comprising:
right-side second locking means connected with said mounting frame and said right-side anti-ingress panel for selectively locking said right-side anti-ingress panel in said first right-side anti-ingress panel position; and
left-side second locking means connected with said mounting frame and said left-side anti-ingress panel for selectively locking said left-side anti-ingress panel in said first left-side anti-ingress panel position.

9. The anti-ingress system of claim 8, wherein said right-side second locking means and said left-side second locking means comprise:
a second hole in said right-side hinge pin aligning with a second hole in said right-side hinge knuckle so that a portion of said first lock may be passed therethrough so as to selectively lock said right-side anti-ingress panel relative to said mounting frame; and
a second hole in said left-side hinge pin aligning with a second hole in said left-side hinge knuckle so that said second lock may be passed therethrough so as to selectively lock said left-side anti-ingress panel relative to said mounting frame.

10. The anti-ingress system for a motor vehicle of claim 9, further comprising:

right-side extension means connected with said right-side anti-ingress panel for selectively extending said right-side anti-ingress panel from a first length to a second selectably lockable length; and left-side extension means connected with said left-side anti-ingress panel for selectively extending said left-side anti-ingress panel from a first length to a second selectably lockable length.

11. The anti-ingress system for a motor vehicle of claim 1, wherein said right-side hinge means and said left-side hinge means comprise:

a right-side pivot block connected with said right side of said mounting frame, said right-side pivot block having an aperture;

a right-side pivot pin connected with said right-side anti-ingress panel, said right-side pivot pin being received by said aperture of said right-side pivot block so that said right-side anti-ingress panel may be pivoted from said first right-side anti-ingress panel position to said second right-side anti-ingress panel position;

a left-side pivot block connected with said left side of said mounting frame, said left-side pivot block having an aperture; and a left-side pivot pin connected with said left-side anti-ingress panel, said left-side pivot pin being received by said aperture of said left-side pivot block so that said left-side anti-ingress panel may be pivoted from said first left-side anti-ingress panel position to said second left-side anti-ingress panel position.

12. The anti-ingress system for a motor vehicle of claim 11, further comprising:

right-side extension means connected with said right-side anti-ingress panel for selectively extending said right-side anti-ingress panel from a first length to a second selectably lockable length; and left-side extension means connected with said left-side anti-ingress panel for selectively extending said left-side anti-ingress panel from a first length to a second selectably lockable length.

13. The anti-ingress system for a motor vehicle of claim 12, wherein the rear side of the occupant compartment of the motor vehicle has a rear window, said anti-ingress system for a motor vehicle further comprising a rear panel connected with said mounting frame, said rear panel being dimensioned to prevent ingress into said occupant compartment through the rear window of the rear side of the occupant compartment when said mounting frame is mounted to the motor vehicle adjacent the occupant compartment.

14. The anti-ingress system for a motor vehicle of claim 11, wherein said right-side locking means and said left-side locking means further comprise:

a first lock;

a second lock;

a right-side tab connected to said right side of said mounting frame, said right-side tab having a hole;

right-side slot means connected with said right-side anti-ingress panel, said right-side slot means receiving said right-side tab when said right-side anti-ingress panel is in said second right-side anti-ingress position so that a portion of said first lock may be passed through said hole in said right-side tab so as to selectively lock said right-side anti-ingress panel relative to said mounting frame;

a left-side tab connected to said left side of said mounting frame, said left-side tab having a hole; and left-side slot means connected with said left-side anti-ingress panel, said left-side slot means receiving said left-side tab when said left-side anti-ingress panel is in said second left-side anti-ingress position so that a portion of said second lock may be passed through said hole in said left-side tab so as to selectively lock said left-side anti-ingress panel relative to said mounting frame.

15. The anti-ingress system for a motor vechicle of claim 14, wherein said right-side hinge means and said left-side hinge means further comprise:

a right-side stand-off connected with said mounting frame for mounting said right-side pivot block thereonto, said right-side pivot pin being connected with said right-side anti-ingress panel at an off-set location relative thereto so that: 1) said right-side pivot pin may be received by said aperture of said right-side pivot block and said right-side pivot pin may be axially slid in a first direction within said aperture of said right-side pivot block without interference by said right-side tab when said right-side anti-ingress panel is at said first right-side anti-ingress panel position, and 2) so that said right-side anti-ingress panel may be axially slid in a second direction within said aperture of said right side pivot block thereby permitting said right-side anti-ingress panel to be pivoted from said first right-side anti-ingress panel position to said second right-side anti-ingress panel position whereat said right-side slot means receives said right-side tab; and a left-side stand-off connected with said mounting frame for mounting said left-side pivot block thereonto, said left-side pivot pin being connected with said left-side anti-ingress panel at an off-set location relative thereto so that: 1) said left-side pivot pin may be received by said aperture of said left-side pivot block and said left-side pivot pin may be axially slid in said second direction within said aperture of said left-side pivot block without interference by said left-side tab when said left-side anti-ingress panel is at said first left-side anti-ingress panel position, and 2) so that said left-side anti-ingress panel may be axially slid in said first direction within said aperture of said left-side pivot block, thereby permitting said left-side anti-ingress panel to be pivoted from said first left-side anti-ingress panel position to said second left-side anti-ingress panel position whereat said left-side slot means receives said left-side tab.

16. The anti-ingress system for a motor vehicle of claim 15, further comprising:

right-side extension means for selectively extending said right-side anti-ingress panel from a first length to a second selectably lockable length; and left-side extension means for selectively extending said left-side anti-ingress panel from a first length to a second selectably lockable length.

17. The anti-ingress system for a motor vehicle of claim 15, wherein the rear side of the occupant compartment of the motor vehicle has a rear window, said anti-ingress system for a motor vehicle further comprising a rear panel connected with said mounting frame, said rear panel being dimensioned to prevent ingress into said occupant compartment through the rear window of the rear side of the occupant compartment when said mounting frame is mounted to the motor vehicle adjacent the occupant compartment.

18. A motor vehicle equipped with an anti-ingress system, comprising:
   a motor vehicle;
   an occupant compartment connected with said motor vehicle, said occupant compartment having a right side, a left side, and a rear side, each of said right and left sides having at least one side door, each said side door having a side window;
   a mounting frame connected with said motor vehicle, said mounting frame having a left side and a right side;
   mounting means connected with said mounting frame for mounting said mounting frame to said motor vehicle, said mounting frame being mounted adjacent said occupant compartment;
   a right-side anti-ingress panel movably connected with said right side of said mounting frame, said right-side anti-ingress panel being movable from a first right-side anti-ingress panel position to a second right-side anti-ingress panel position;
   right-side hinge means connected with said mounting frame and said right-side anti-ingress panel for movably connecting said right-side anti-ingress panel to said right side of said mounting frame;
   right-side locking means connected with said mounting frame and said right-side anti-ingress panel for selectively locking said right-side anti-ingress panel in said second right-side anti-ingress panel position;
   a left-side anti-ingress panel movably connected with said left side of said mounting frame, said left-side anti-ingress panel being movable from a first left-side anti-ingress panel position to a second left-side anti-ingress panel position;
   left-side hinge means connected with said mounting frame and said left-side anti-ingress panel for movably connecting said left-side anti-ingress panel to said left side of said mounting frame; and
   left-side locking means connected with said mounting frame and said left-side anti-ingress panel for selectively locking said left-side anti-ingress panel in said second left-side anti-ingress position;
   said left-side and right-side anti-ingress panels being dimensioned so that said right-side anti-ingress panel does not interfere with opening said at least one side door of said right side of said motor vehicle when said right-side anti-ingress panel is at said first right-side anti-ingress panel position but said right-side anti-ingress panel does interfere with opening said at least one side door of said right side of said motor vehicle and further said right-side anti-ingress panel prevents ingress into the occupant compartment through each said side window of said at least one side door of said right side of said motor vehicle when said right-side anti-ingress panel is at said second right-side anti-ingress panel position, and said left-side anti-ingress panel does not interfere with opening said at least one side door of said left side of said motor vehicle when said left-side anti-ingress panel is at said first left-side anti-ingress panel position but said left-side anti-ingress panel does interfere with opening said at least one side door of said left side of said motor vehicle and further said left-side anti-ingress panel prevents ingress into the occupant compartment through each said side window of said at least one side door of said left side of said motor vehicle when said left-side anti-ingress panel is at said second left-side anti-ingress panel position.

19. The motor vehicle equipped with an anti-ingress system of claim 18, further comprising:
   right-side extension means connected with said right-side anti-ingress panel for selectively extending said right-side anti-ingress panel from a first length to a second selectably lockable length; and
   left-side extension means connected with said left-side anti-ingress panel for selectively extending said left-side anti-ingress panel from a first length to a second selectably lockable length.

20. The motor vehicle equipped with an anti-ingress system of claim 18, wherein the rear side of the occupant compartment of the motor vehicle has a rear window, said motor vehicle with an anti-ingress system further comprising a rear panel connected with said mounting frame, said rear panel being dimensioned so as to prevent ingress into said occupant compartment through the rear window of the rear side of the occupant compartment.

21. An anti-ingress system for a motor vehicle, said motor vehicle having an occupant compartment, said occupant compartment having a right side, a left side, and a rear side, each of said right and left sides having a side door, said anti-ingress system comprising:
   a mounting frame having a left side and a right side;
   mounting means connected with said mounting frame for mounting said mounting frame to the motor vehicle adjacent said rear side of said occupant compartment;
   a right-side anti-ingress panel movably connected with said right side of said mounting frame, said right-side anti-ingress panel being movable from a first right-side anti-ingress panel position to a second right-side anti-ingress panel position;
   right-side hinge means connected with said mounting frame and said right-side anti-ingress panel for movably connecting said right-side anti-ingress panel to said right side of said mounting frame;
   right-side locking means connected with said mounting frame and said right-side anti-ingress panel for selectively locking said right-side anti-ingress panel in said second right-side anti-ingress panel position;
   a left-side anti-ingress panel movably connected with said left side of said mounting frame, said left-side anti-ingress panel being movable from a first left-side anti-ingress panel position to a second left-side anti-ingress panel position;
   left-side hinge means connected with said mounting frame and said left-side anti-ingress panel for movably connecting said left-side anti-ingress panel to said left-side of said mounting frame; and
   left-side locking means connected with said mounting frame and said left-side anti-ingress panel for selectively locking said left-side anti-ingress panel in said second left-side anti-ingress position;
   said left-side and right-side anti-ingress panels being dimensioned so that when said mounting frame is mounted on said motor vehicle by said mounting means so that said right-side anti-ingress panel is located adjacent said right side of said occupant compartment and so that said left-side anti-ingress panel is located adjacent said left side of said passenger compartment, said right-side anti-ingress panel does not interfere with opening said side door of said right side of said motor vehicle when said right-side anti-ingress panel is at said first right-side anti-ingress panel position but said right-side anti-ingress panel does interfere with opening said side door of said right side of said motor vehicle when said right-side anti-ingress panel is at said second right-side anti-ingress panel position, and said left-side anti-ingress panel does not interfere with opening said side door of said left side of said motor vehicle when said left-side anti-ingress panel is at said first left-side anti-ingress panel position but said left-side anti-ingress panel does interfere with opening said side door of said left side of said motor vehicle when said left-side anti-ingress panel is at said second left-side anti-ingress panel position.

22. A method for preventing ingress to a motor vehicle where said motor vehicle has a right side and a left side, said right side having at least one right-side door, said left side having at least one left-side door, said method comprising the steps of:

mounting a frame to the motor vehicle;

moving a first anti-ingress panel connected with said frame from a first position that does not interfere with opening said at least one right-side door of the motor vehicle to a second position that does interfere with opening said at least one right-side door of said motor vehicle;

locking said first anti-ingress panel in said second position;

moving a second anti-ingress panel connected with said frame from a first position that does not interfere with opening said at least one left-side door of the motor vehicle to a second position that interferes with opening said at least one left-side door of said motor vehicle; and locking said second anti-ingress panel in said second position.

23. The method of claim 22, wherein said motor vehicle further has a side window in each of said at least one right-side and left-side doors thereof, said step of moving said first anti-ingress panel to the respective second position thereof further comprises moving said first anti-ingress panel so that said first anti-ingress panel interferes with ingress through each side window of said at least one right-side door when said first anti-ingress panel is at the respective second position thereof; and said step of moving said second anti-ingress panel to the respective second position thereof further comprises moving said second anti-ingress panel so that said second anti-ingress panel interferes with ingress through each said window of said at least one left-side door when said second anti-ingress panel is at the respective second position thereof.

* * * * *